United States Patent
Nilsson et al.

(10) Patent No.: US 10,742,298 B2
(45) Date of Patent: Aug. 11, 2020

(54) BEAM MANAGEMENT IN A COMMUNICATIONS NETWORK

(71) Applicant: Telefonaktiebolaget LM Ericsson (publ), Stockholm (SE)

(72) Inventors: Andreas Nilsson, Gothenburg (SE); Fredrik Athley, Kullavik (SE); Sven Petersson, Sävedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 261 days.

(21) Appl. No.: 15/742,992

(22) PCT Filed: Dec. 8, 2017

(86) PCT No.: PCT/EP2017/082070
§ 371 (c)(1),
(2) Date: Jan. 9, 2018

(87) PCT Pub. No.: WO2019/110123
PCT Pub. Date: Jul. 13, 2019

(65) Prior Publication Data
US 2019/0386733 A1 Dec. 19, 2019

(51) Int. Cl.
*H04B 7/06* (2006.01)
*H04B 7/0456* (2017.01)
*H04B 7/08* (2006.01)
*H04B 7/10* (2017.01)
*H04L 5/00* (2006.01)

(52) U.S. Cl.
CPC ......... *H04B 7/0695* (2013.01); *H04B 7/0469* (2013.01); *H04B 7/063* (2013.01); *H04B 7/088* (2013.01); *H04B 7/10* (2013.01); *H04L 5/0048* (2013.01)

(58) Field of Classification Search
CPC .................................................... H04B 7/0695
USPC ......................................................... 375/267
See application file for complete search history.

(56) References Cited

U.S. PATENT DOCUMENTS

| 8,457,026 | B1 | 6/2013 | Ho et al. | |
| 2006/0171357 | A1* | 8/2006 | King | H04W 72/046 370/331 |
| 2008/0095251 | A1* | 4/2008 | Yeh | H04B 7/0634 375/260 |

(Continued)

FOREIGN PATENT DOCUMENTS

EP 2790342 A1 10/2014

OTHER PUBLICATIONS

International Search Report and Written Opinion of the International Searching Authority, PCT/EP2017/082070, dated Aug. 1, 2018, 17 pages.

*Primary Examiner* — Lihong Yu
(74) *Attorney, Agent, or Firm* — Sage Patent Group

(57) ABSTRACT

There is provided mechanisms for beam management. A method is performed by a radio transceiver device. The method comprises performing a beam management procedure by simultaneously transmitting a first reference signal in a first set of beams and a second reference signal in a second set of beams. The first set of beams is transmitted at a first antenna array of the radio transceiver device and in a first polarization. The second set of beams is transmitted at a second antenna array of the radio transceiver device and in a second polarization.

21 Claims, 4 Drawing Sheets

(56) References Cited

U.S. PATENT DOCUMENTS

| | | | |
|---|---|---|---|
| 2010/0238824 A1* | 9/2010 | Farajidana | H04B 7/0417 |
| | | | 370/252 |
| 2018/0054241 A1* | 2/2018 | Pi | H04B 7/0695 |
| 2018/0124724 A1* | 5/2018 | Tsai | H04W 56/0005 |

* cited by examiner (a)                                     (b)

BEAM MANAGEMENT IN A COMMUNICATIONS NETWORK

CROSS REFERENCE TO RELATED APPLICATIONS

This application is a 35 U.S.C. § 371 national stage application of PCT International Application No. PCT/EP2017/082070 filed on Dec. 8, 2017, the disclosure and content of which is incorporated by reference herein in its entirety.

TECHNICAL FIELD

Embodiments presented herein relate to a method, a radio transceiver device, a computer program, and a computer program product for beam management.

BACKGROUND

In communications networks, there may be a challenge to obtain good performance and capacity for a given communications protocol, its parameters and the physical environment in which the communications network is deployed.

For example, transmission schemes and reception schemes based on the use of narrow beams might be needed at high frequencies to compensate for propagation losses. For a given communication link, a beam can be applied at both the network side (such as at the transmission and reception point (TRP) of a network node) and the user side (such as at terminal devices served by the network node). A beam pair link (BPL) is defined by the beam used by the TRP (denoted TRP beam) for communicating with the terminal device and the beam used by the terminal device (denoted UE beam) for communicating with the TRP. Each of the TRP beam and the UE beam could be used for any of transmission and reception. Likewise, there could be separate BPLs for downlink communications (where the TRP beam is a transmission (TX) beam and where the UE beam is a reception (RX) beam) and uplink communications (where the TRP beam is an RX beam and where the UE beam is a TX beam).

In general terms, a beam management procedure is used to discover and maintain BPLs. A BPL is expected to be discovered and monitored by the network using measurements on downlink reference signals used for beam management, such as channel state information reference signals (CSI-RS). The CSI-RS for beam management can be transmitted periodically, semi-persistently or aperiodic (such as being event triggered) and they can be either shared between multiple terminal devices or be device-specific.

In order to find a suitable TRP beam the TRP transmits CSI-RS in different TRP TX beams on which the terminal devices performs reference signal received power (RSRP) measurements and reports back the N best TRP TX beams (where the value of N can be configured by the network). Furthermore, the CSI-RS transmission on a given TRP TX beam can be repeated to allow the terminal device to evaluate suitable UE beams, thus enabling so-called UE RX beam training.

If the TRP has dual-polarized antennas, each CSI-RS resource will typically be configured with two antenna ports, one antenna port per polarization, such that the terminal device can measure average RSRP over both polarizations and hence reduce the risk of polarization mismatch. Another advantage with two-port beam management is that the terminal device can choose the best beam not only based on highest RSRP, but also consider parameters such as rank, user throughput, etc. One reason for choosing CSI-RS as the reference signal for beam management is that the terminal device can then directly report preferred CQI, rank and precoder after a beam management procedure, which will reduce the latency between a beam management procedure and data transmission.

It is envisioned that for some TRPs having two or more antenna arrays, or panels, these two or more antenna arrays, or panels, might be simultaneously used. It is further envisioned that two antenna arrays, or panels, might be simultaneously used for beam management purposes. But there are not any existing mechanisms that disclose, or envision, how such a beam management process would be implemented.

Hence, there is still a need for an improved beam management, especially when two antenna arrays, or panels, simultaneously are used.

SUMMARY

An object of embodiments herein is to provide efficient beam management that can be applied when two antenna arrays, or panels, are simultaneously used.

According to a first aspect there is presented a method for beam management. The method is performed by a radio transceiver device. The method comprises performing a beam management procedure by simultaneously transmitting a first reference signal in a first set of beams and a second reference signal in a second set of beams. The first set of beams is transmitted at a first antenna array of the radio transceiver device and in a first polarization. The second set of beams is transmitted at a second antenna array of the radio transceiver device and in a second polarization.

According to a second aspect there is presented a radio transceiver device for beam management. The radio transceiver device comprises processing circuitry. The processing circuitry is configured to cause the radio transceiver device to perform a beam management procedure by simultaneously transmitting a first reference signal in a first set of beams and a second reference signal in a second set of beams. The first set of beams is transmitted at a first antenna array of the radio transceiver device and in a first polarization. The second set of beams is transmitted at a second antenna array of the radio transceiver device and in a second polarization.

According to a third aspect there is presented a radio transceiver device for beam management. The radio transceiver device comprises a beam management module. The beam management module is configured to perform a beam management procedure by simultaneously transmitting a first reference signal in a first set of beams and a second reference signal in a second set of beams. The first set of beams is transmitted at a first antenna array of the radio transceiver device and in a first polarization. The second set of beams is transmitted at a second antenna array of the radio transceiver device and in a second polarization.

According to a fourth aspect there is presented a computer program for beam management, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously the proposed beam management can be applied when two antenna arrays, or panels, are simultaneously used.

Advantageously the proposed beam management enables the correlation between the two antenna arrays to be reduced by both using different polarization different spatial properties. Advantageously, this will, in turn, increase the possibility of higher order spatial multiplexing and diversity.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

Figure 1:
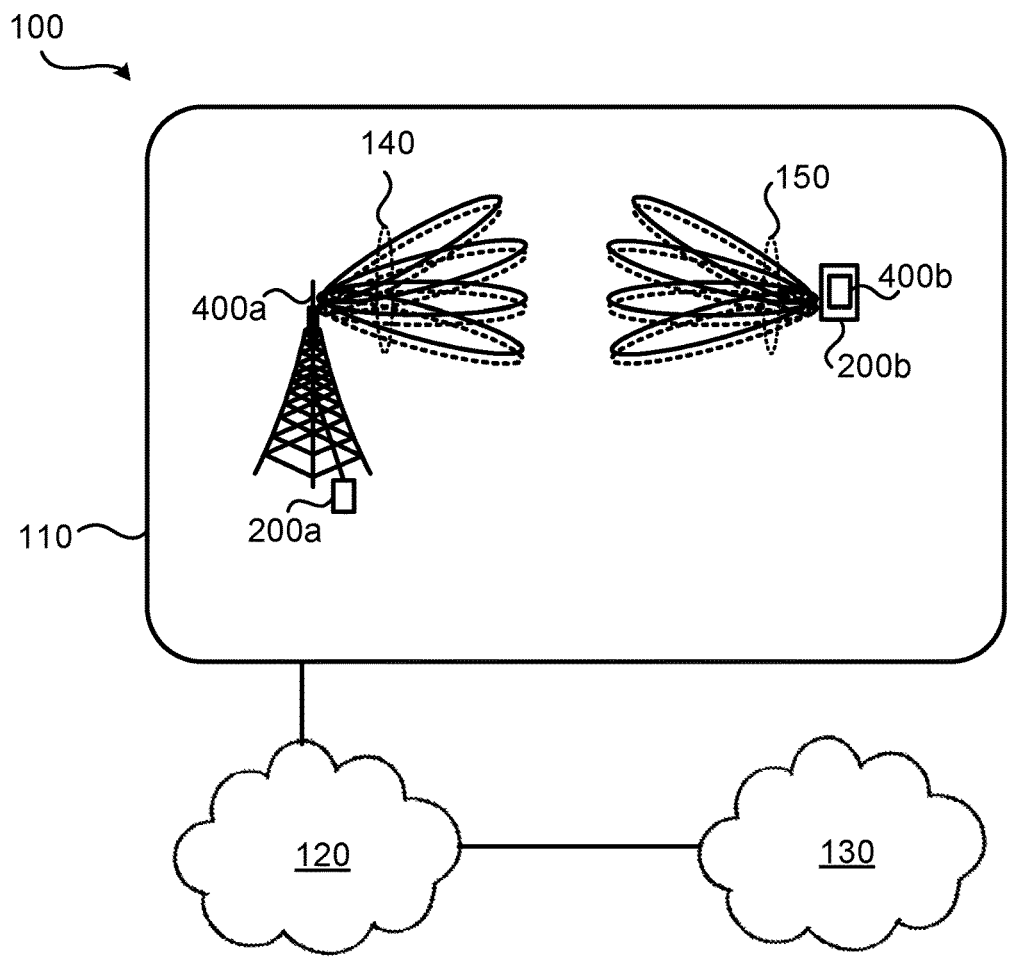
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications network 100 comprises a radio transceiver device 200a configured to, via TRP 400a, provide network access to radio transceiver device 200b in a radio access network no. In some embodiments radio transceiver device 200b is part of, integrated with, or collocated with, a terminal device and radio transceiver device 200a is part of, integrated with, or collocated with, a radio access network node. Further, radio transceiver device 200a might comprise TRP 400a, and radio transceiver device 200b might comprise a TRP 400b.

The radio access network no is operatively connected to a core network 120. The core network 120 is in turn operatively connected to a service network 130, such as the Internet. Radio transceiver device 200b is thereby, via the radio transceiver device 200a, enabled to access services of, and exchange data with, the service network 130.

Examples of network nodes are radio access network nodes, radio base stations, base transceiver stations, Node Bs, evolved Node Bs, gigabit Node Bs, access points, and access nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

Radio transceiver device 200a and radio transceiver device 200b are assumed to be configured to use beamforming when communicating with each other. In FIG. 1 this is illustrated by beams, collectively identified at reference numeral 140 for beams being used at radio transceiver device 200a, and at reference numeral 150 for beams being used at radio transceiver device 200b. The beams could be used for either transmission only, or reception only, or for both transmission and reception. Beams in a first polarization, P1, are illustrated with dotted lines whereas beams in a second polarization, P2, are illustrated with solid lines.

As disclosed above, it is envisioned that two antenna arrays, or panels, might be simultaneously used for beam management purposes but that there are not any existing mechanisms that disclose, or envision, how such a beam management process would be implemented.

The embodiments disclosed herein relate to mechanisms for beam management. In order to obtain such mechanisms there is provided a radio transceiver device 200a, a method performed by the radio transceiver device 200a, a computer program product comprising code, for example in the form of a computer program, that when run on a radio transceiver device 200a, causes the radio transceiver device 200a to perform the method.

Figure 2:
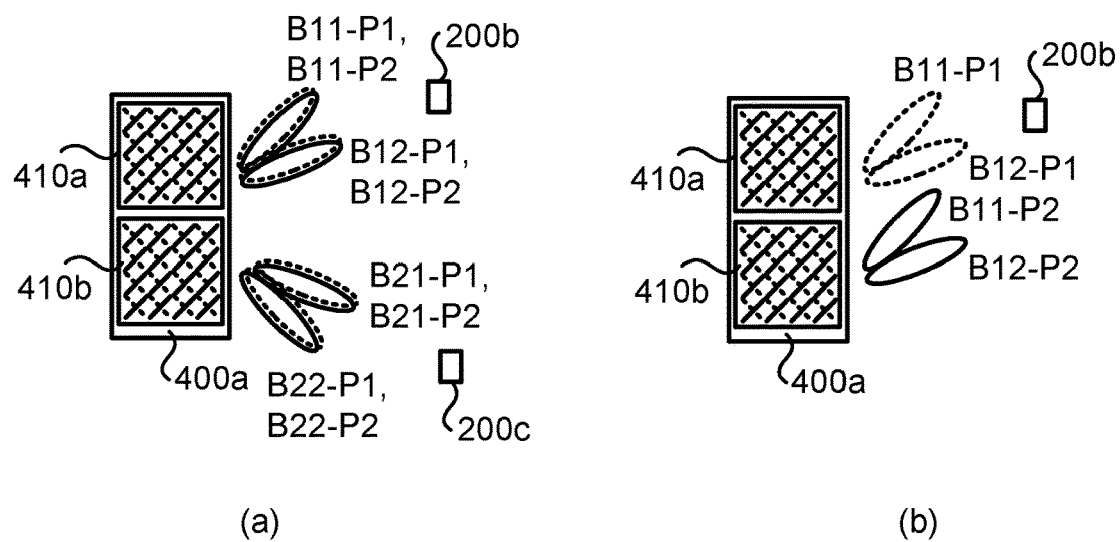
FIG. 2 schematically illustrates a transmission and reception point of a radio transceiver device according to an embodiment.

FIG. 2 schematically illustrates the TRP 400a of radio transceiver device 200a according to embodiments. The TRP 400a comprises a first antenna array 410a and a second antenna array 410b. Generally, the TRP 400a might be assumed to comprise at least two antenna arrays 410a, 410b. In turn, each antenna array 410a, 410b comprises antenna elements of two polarizations P1, P2. The individual antenna elements might for this purpose either be single polarized or dual-polarized.

Each antenna array 410a, 410b might belong to a separate panel. In general terms, a panel is a rectangular antenna array of dual-polarized antenna elements with typically one transmit/receive unit (TXRU) per polarization. An analog distribution network with phase shifters might be used to steer the beams of each panel. Multiple panels can be stacked next to each other in the same TRP 400a to increase the maximum number of layers that the TRP 400a can transmit. Multiple panels at the TRP 400a also facilitate the use of MU-MIMO (and/or simultaneously serving different radio transceiver devices 200b, 200c on separate resources). One purpose of MU-MIMO is to serve multiple radio transceiver devices 200b, 200c simultaneously in the same time, frequency, and code resources and in this way increase the capacity in the communications network 100. With two panels at the TRP 400a one panel can for example serve one radio transceiver device 200b at the same time as the other panel serves another radio transceiver device 200c.

In the example of FIG. 2(a) the TRP 400a is configured to simultaneously transmit reference signals in beams B11, B12 from the first antenna array 410a using polarizations P1 and P2, and in beams B21, B22 from the second antenna array 410b using polarizations P1 and P2. During the beam management procedure two different TRP beams are evaluated per radio transceiver device 200b, 200c; beams B11 and B12 for radio transceiver device 200b and beams B21 and B22 for radio transceiver device 200c. Therefore, typically the beams from one of the antenna arrays 410a could be pointing towards one radio transceiver device 200b, whereas the beams from the other of the antenna arrays 410b could be pointing towards another radio transceiver device 200c.

In the example of FIG. 2(b) the TRP 400a is configured to simultaneously transmit reference signals in beams B11, B12 from the first antenna array 410a using polarization P1, and in beams B11, B12 from the second antenna array 410b using polarization P2. The beams from both antenna arrays 410a, 410b thus point towards one and the same radio transceiver device 200b. However, as the skilled person understands, the beam management is illustrated in FIG. 2(b) can be generalized to two radio transceiver devices 200b, 200c.

Each reference signal might be regarded as being transmitted from an antenna port at the TRP 400a. Thus, assuming that one antenna port is transmitted from each antenna array 410a, 410b, or panel, or one antenna port for each polarization in one of the antenna arrays 410a, 410b, this will result in a so-called two-port beam management procedure. For the example of FIG. 2(a), the two antenna ports for each beam is transmitted for different polarization from the antenna array, whilst for the example of FIG. 2(b), the two antenna ports for each beam is transmitted from different antenna arrays as well as for different polarizations. This means that the correlation between the two antenna ports for each beam in the example of FIG. 2(b) statistically will be lower compared to the example of FIG. 2(a) due to the fact that both polarization orthogonality and spatial de-correlation is applied on the two antenna ports. With lower correlation between the antenna ports, spatial multiplexing and diversity might be improved. In this respect, polarization properties between the different antenna arrays could be rather random, especially if the antenna arrays are of a radio transceiver device embodied as a terminal device, and therefore polarization orthogonality could in some situation not be used for higher order spatial multiplexing and/or diversity. Hence, adding additional spatial de-correlation between the beams used for the transmission of the reference signals might help to still improve the performance of spatial multiplexing and diversity.

The transmission of reference signals as in the example of FIG. 2(b) might thus be advantageous over the example of FIG. 2(a). Further details, aspects, embodiments, and examples of transmission of reference signals as in the example of FIG. 2(b) will be disclosed next.

Figure 3:
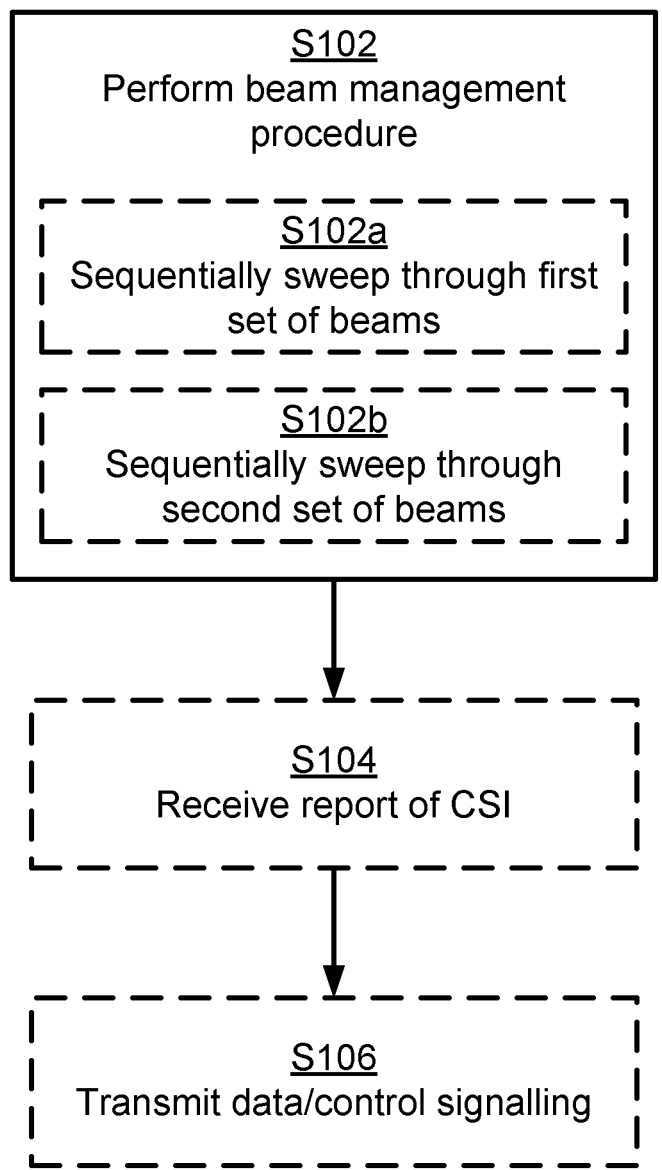
FIG. 3 is a flowchart of methods according to embodiments.

FIG. 3 is a flowchart illustrating embodiments of methods for beam management. The methods are performed by the radio transceiver device 200a. The methods are advantageously provided as computer programs 720.

As disclosed above, with reference to FIG. 2(b), beams from different antenna arrays and different polarizations could be used together during beam management. Particularly, radio transceiver device 200a is configured to perform step S102:

S102: Radio transceiver device 200a performs a beam management procedure. The beam management procedure is performed by radio transceiver device 200a simultaneously transmitting a first reference signal in a first set of beams (as defined by beams B11-P1, B12-P1) and a second reference signal in a second set of beams (as defined by B11-P2, B12-P2).

The first set of beams B11-P1, B12-P1 is transmitted at a first antenna array 410a of the radio transceiver device 200a and in a first polarization P1.

The second set of beams B11-P2, B12-P2 is transmitted at a second antenna array 410b of the radio transceiver device 200a and in a second polarization P2.

Embodiments relating to further details of beam management as performed by the radio transceiver device 200a will now be disclosed.

As disclosed above, in some aspects each of the first reference signal and the second reference signal are transmitted at a respective antenna port of the radio transceiver device 200a.

As disclosed above, in some aspects the first antenna array 410a and the second antenna array 410b belong to mutually different panels.

As disclosed above, the first set of beams B11-P1, B12-P1 is transmitted in a first polarization P1 and the second set of beams B11-P2, B12-P2 is transmitted in a second polarization P2. P2 is assumed to be different from P1. There could be different types of mutually different polarizations P1, P2 used. Particularly, according to an embodiment the first polarization and the second polarization are mutually orthogonal.

As disclosed above, in some aspects TRP 400a comprises two or more antenna arrays, or panels. There could then be different ways for radio transceiver device 200a to transmit the reference signals using a first of the two or more antenna arrays, or panels, and a second of the two or more antenna arrays, or panels. In some aspects antenna ports are used from those two antenna arrays, or panels, that have the lowest mutual correlation. Particularly, according to an embodiment radio transceiver device 200a has at least three antenna arrays, and the reference signals are transmitted at those two of the at least three antenna arrays having lowest mutual correlation.

There may be different ways to simultaneously transmit the first reference signal and the second reference signal, as in step S102.

In some aspects radio transceiver device 200a performs a beam sweep when the reference signals are transmitted. Particularly, according to an embodiment radio transceiver device 200a is configured to perform (optional) steps S102a and S102b as part of the beam management procedure:

S102a: Radio transceiver device 200a sequentially sweeps through beams of the first set of beams B11-P1, B12-P1 whilst transmitting the first reference signal in the first set of beams B11-P1, B12-P1.

S102b: Radio transceiver device 200a sequentially sweeps through beams of the second set of beams B11-P2, B12-P2 whilst transmitting the second reference signal in the second set of beams B11-P2, B12-P2.

This embodiment (i.e. steps S102a and S102b) could typically be part of a TRP TX beam training procedure.

In some aspects radio transceiver device 200a transmits several occurrences of the reference signal in each beam. Particularly, according to an embodiment a first burst of occurrences of the first reference signal is transmitted per beam in the first set of beams B11-P1, B12-P1. A second burst of occurrences of the second reference signal is then transmitted per beam in the second set of beams B11-P2, B12-P2.

This embodiment (transmission of the reference signals in bursts) could typically be part of a UE RX beam training procedure. In other words, radio transceiver device 200a will, according to this embodiment, transmit the respective reference signal repeatedly for each beam and letting radio transceiver device 200b evaluate different UE RX beams.

In some aspects it might be assumed that radio transceiver device 200b receiving the reference signals measures which beam that was best (based on, for example, estimated user throughput or some other performance metric) and reports back a beam index for the best beam. Particularly, according to an embodiment radio transceiver device 200a is configured to perform (optional) step S104:

S104: Radio transceiver device 200a receives a report of channel state information (CSI). The CSI pertains to a channel quality indicator (CQI), rank indicator (RI), a precoder matrix indicator (PMI), a CSI-RS resource indicator (CRI), and/or RSRP. The report is received from radio transceiver device 200b. The report is based on the first reference signal and the second reference signal as transmitted towards radio transceiver device 200b (and thus as received by radio transceiver device 200b). In more detail, the CRI provides a reference to the beam in which the reference signal was received by from radio transceiver device 200b at highest RSRP. In some aspects the RSRP represents so-called Layer-1 reference signal received power (L1-RSRP) corresponding to the CRI. In general terms, N different CRIs for the N best reported beams could be provided in the report, each with its own corresponding L1-RSRP, where N can be configured by the network.

In some aspects radio transceiver device 200a uses the CSI when determining what beamforming to use for radio transceiver device 200b during subsequent data or control transmission.

Particularly, according to an embodiment radio transceiver device 200a is configured to perform (optional) step S106:

S106: Radio transceiver device 200a transmits at least one of data and control signalling towards radio transceiver device 200b. The signalling is transmitted using a first beam of the first set of beams B11-P1, B12-P1 and a second beam of the second set of beams B11-P2, B12-P2.

Which beam in the first set of beams B11-P1, B12-P1 to select as the first beam and which of beam in the second set of beams B11-P2, B12-P2 to select as the second beam is based on the report (i.e., the report received in step S104).

Hence, the transmission to radio transceiver device 200b in step S106 is based on using beamforming weights on the two antenna ports used during the beam management procedure, where the beamforming weights are determined according to the reported CSI. In further detail, the beamforming weights for an antenna port are determined based on the reported CRI. Precoding weights across the antenna ports are determined based on the reported PMI.

Particularly, according to an embodiment the at least one of data and control signalling is transmitted using the same antenna ports as used during the beam management.

There could be different examples of reference signals that are transmitted. Which type of reference signals that are transmitted generally depends on the type of radio transceiver device 200a transmitting the reference signals and the type of radio transceiver device 200b intended to receive the reference signals. Particularly, according to an embodiment the reference signals are channel state information reference signals (CSI-RS), sounding reference signals (SRS), sidelink channel state information reference signals (SCSI-RS), or synchronization signal block (SSB) signals. The reference signals are typically CSI-RS or SSB signals when radio transceiver device 200a is a network node and radio transceiver device 200b is a terminal device. The reference signals are typically SRS when radio transceiver device 200a is a terminal device and radio transceiver device 200b is a network node. The reference signals are typically SCSI-RS when radio transceiver device 200a and radio transceiver device 200b are of the same type; for example both being network nodes or both being terminal devices.

Figure 4:
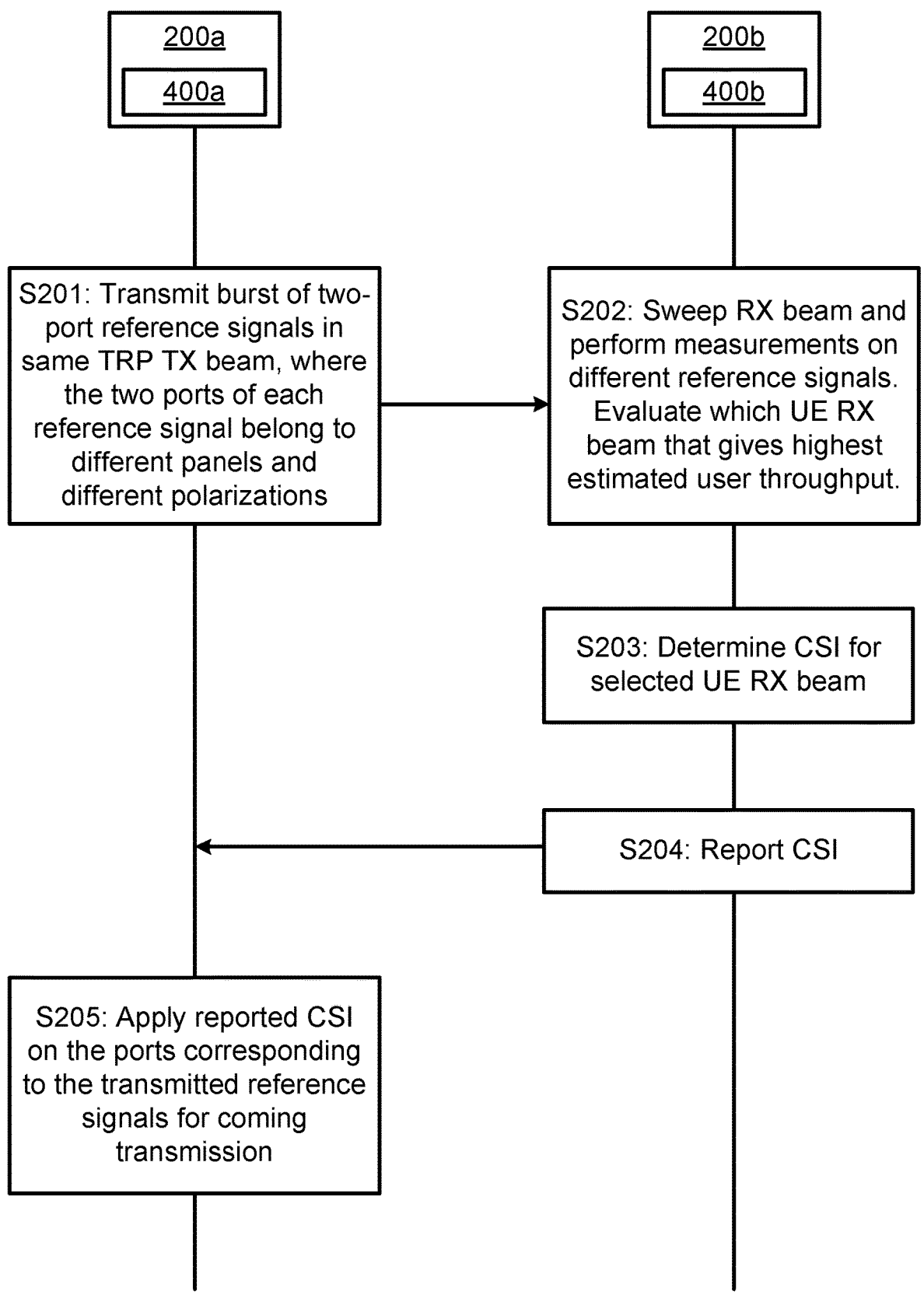
FIG. 4 is a signalling diagram of a method according to an embodiment.

One particular embodiment for beam training as performed by radio transceiver device 200a will now be disclosed with reference to FIG. 4. FIG. 4 is a signalling diagram of beam training as herein disclosed and as applied for a UE RX beam training procedure. Hence, according to this particular embodiment, radio transceiver device 200a is a network node and radio transceiver device 200b is a terminal device.

S201: Radio transceiver device 200a transmits a burst of two-port CSI-RS resources repeatedly in the same TRP TX beam. The two antenna ports of each CSI-RS resource belong to mutually different antenna arrays and mutually different polarizations. One way to implement step S201 is to perform step S102.

S202: Radio transceiver device 200b sweeps at least one UE RX beam whilst performing measurements on the different CSI-RS resources and determines a best UE RX beam by, for example, evaluating the estimated user throughput.

S203: Radio transceiver device 200b, when the best UE RX beam has been found, determines CQI, rank and precoder for the best UE RX beam.

S204: Radio transceiver device 200b reports CQI, RI, and PMI back to radio transceiver device 200a. Radio transceiver device 200a thus receives the report. One way to implement step S204 is to perform step S104.

S205: Radio transceiver device 200a, for the next DL transmission, uses the reported CQI, RI and PMI to determine beamforming weights for the antenna ports corresponding to the CSI-RS resource used during the beam management procedure. One way to implement step S205 is to perform step S106.

Figure 5:
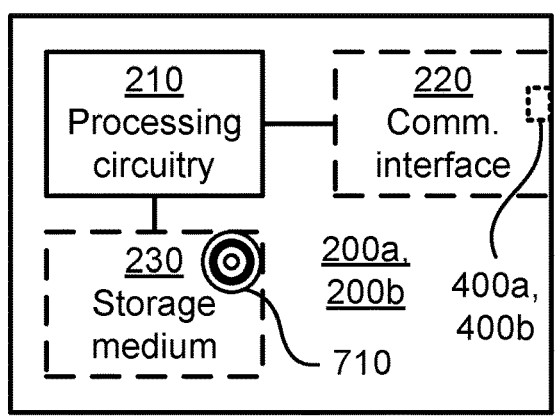
FIG. 5 is a schematic diagram showing functional units of a radio transceiver device according to an embodiment.

FIG. 5 schematically illustrates, in terms of a number of functional units, the components of a radio transceiver device 200a, 200b according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200a, 200b to perform a set of operations, or steps, S102-S106, as disclosed above. For example, the storage medium 230 may store the set of operations, and the processing circuitry 210 may be configured to retrieve the set of operations from the storage medium 230 to cause the radio transceiver device 200a, 200b to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200a, 200b may further comprise a communications interface 220 at least configured for communications with other entities, nodes, functions, and devices of the communications network 100, such as radio transceiver device 200b, 200c. As such the communications interface 220 may comprise one or more transmitters and receivers, comprising analogue and digital components.

Signals could be transmitted from, and received by, a TRP 400a, 400b of radio transceiver device 200a, 200b. The TRP 400a, 400b could form an integral part of radio transceiver device 200a, 200b or be physically separated from radio transceiver device 200a, 200b. The communications interface 220 might thus optionally comprise the TRP 400a, 400b.

The processing circuitry 210 controls the general operation of the radio transceiver device 200a, 200b e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200a, 200b are omitted in order not to obscure the concepts presented herein.

Figure 6:
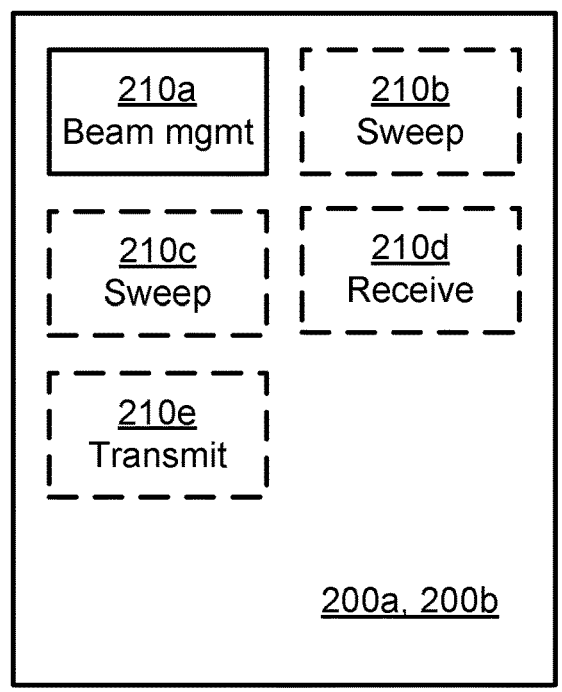
FIG. 6 is a schematic diagram showing functional modules of a radio transceiver device according to an embodiment.

FIG. 6 schematically illustrates, in terms of a number of functional modules, the components of a radio transceiver device 200a, 200b according to an embodiment. The radio transceiver device 200a, 200b of FIG. 6 comprises a beam management module 210a configured to perform step S102. The radio transceiver device 200a, 200b of FIG. 6 may further comprise a number of optional functional modules, such as any of a beam sweep module 210b configured to perform step S102a, a beam sweep module 210c configured to perform step S102b, a receive module 210d configured to perform step S104, and a transmit module 210e configured to perform step S106.

In general terms, each functional module 210a-210e may in one embodiment be implemented only in hardware and in another embodiment with the help of software, i.e., the latter embodiment having computer program instructions stored on the storage medium 230 which when run on the processing circuitry makes the radio transceiver device 200a, 200b perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

The radio transceiver device 200a may be provided as a standalone device or as a part of at least one further device. For example, the radio transceiver device 200a may be provided as a network node and radio transceiver device 200b may be provided as a terminal device. Alternatively, functionality of the radio transceiver device 200a, 200b may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. In this respect, at least part of the radio transceiver device 200a, 200b may reside in the radio access network, such as in the radio access network node, for cases when embodiments as disclosed herein are performed in real time.

Thus, a first antenna portion of the instructions performed by the radio transceiver device 200a, 200b may be executed in a first device, and a second antenna portion of the of the instructions performed by the radio transceiver device 200a, 200b may be executed in a second device; the herein disclosed embodiments are not limited to any particular number of devices on which the instructions performed by the radio transceiver device 200a, 200b may be executed. Hence, the methods according to the herein disclosed embodiments are suitable to be performed by a radio transceiver device 200a, 200b residing in a cloud computational environment. Therefore, although a single processing circuitry 210 is illustrated in FIG. 5 the processing circuitry 210 may be distributed among a plurality of devices, or nodes. The same applies to the functional modules 210a-210e of FIG. 6 and the computer program 720 of FIG. 7 (see below).

Figure 7:
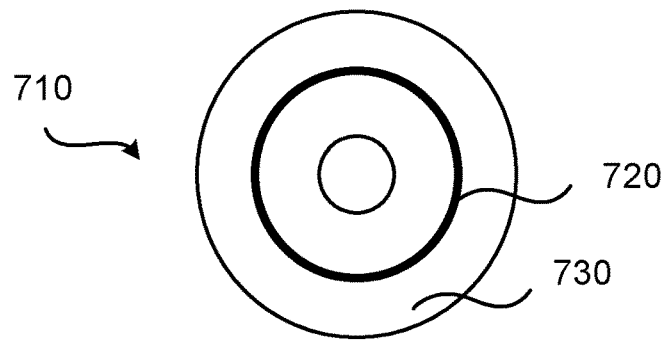
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although MU-MIMO might be assumed in the illustrative example of FIG. 2, however the herein disclosed embodiment can also be applied for SU-MIMO. For example, in some cases two antenna port transmission might be enough with respect to throughput and in order to reduce interference/power consumption only two-port data transmission is used instead of four-port data transmission.

The invention claimed is:

1. A method for beam management, the method being performed by a radio transceiver device, the method comprising:
performing a beam management procedure to discover or maintain a beam pair link by simultaneously transmitting a first reference signal in a first set of beams and a second reference signal in a second set of beams,
wherein the beam management procedure comprises:
sequentially sweeping through beams of the first set of beams while transmitting the first reference signal in the first set of beams; and
sequentially sweeping through beams of the second set of beams while transmitting the second reference signal in the second set of beams,
wherein the first set of beams is transmitted at a first antenna array of the radio transceiver device and in a first polarization, and
wherein the second set of beams is transmitted at a second antenna array of the radio transceiver device and in a second polarization.

2. The method of claim 1, wherein performing the beam management procedure to discover or maintain the beam pair link comprises:
simultaneously transmitting the first reference signal in the first set of beams and the second reference signal in the second set of beams;
determining a first measurement based on the first reference signal and a second measurement based on the second reference signal; and
determining the beam pair link based on the first measurement and the second measurement.

3. The method of claim 1, wherein a first burst of occurrences of the first reference signal is transmitted per beam in the first set of beams, and
wherein a second burst of occurrences of the second reference signal is transmitted per beam in the second set of beams.

4. The method of claim 1, wherein each of the first reference signal and the second reference signal are transmitted at a respective antenna port of the radio transceiver device.

5. The method of claim 1, wherein the first polarization and the second polarization are mutually orthogonal.

6. The method of claim 1, wherein the first antenna array and the second antenna array belong to mutually different panels.

7. The method of claim 1, wherein the radio transceiver device has at least three antenna arrays, and wherein the reference signals are transmitted at those two of the at least three antenna arrays having lowest mutual correlation.

8. The method of claim 1, further comprising receiving a report of channel state information ("CSI") pertaining to at least one of: a channel quality indicator ("CQI"), rank indicator ("RI"), precoder matrix indicator ("PMI"), channel state information reference signal resource indicator ("CRI"), and reference signal received power ("RSRP") from a second radio transceiver device, the report being based on the first reference signal and the second reference signal as transmitted towards the second radio transceiver device.

9. The method of claim 8, further comprising:
transmitting at least one of data and control signaling towards the second radio transceiver device,
wherein the signaling is transmitted using a first beam of the first set of beams and a second beam of the second set of beams, and
wherein which beam in the first set of beams to select as the first beam and which of beam in the second set of beams to select as the second beam is based on the report.

10. The method of claim 4, wherein the at least one of data and control signaling is transmitted using the respective antenna port.

11. The method of claim 1, wherein the reference signals are channel state information reference signals ("CSI-RS") sounding reference signals ("SRS") sidelink channel state information reference signals ("SCSI-RS") or synchronization signal block ("SSB") signals.

12. The method of claim 8, wherein the first set of beams and the second set of beams are each in a direction of the second radio transceiver device.

13. The method of claim 8, wherein the radio transceiver device is a user equipment, UE, and the second radio transceiver device is a radio access network, RAN, node.

14. The method of claim 8, wherein the radio transceiver device is a radio access network, RAN, node, and the second radio transceiver device is a user equipment, UE.

15. A radio transceiver device for beam management, the radio transceiver device comprising:
a first antenna array;
a second antenna array;
processing circuitry; and
memory coupled to the processing circuitry and having instructions stored therein that are executable by the processing circuitry to cause the radio transceiver device to perform operations, the operations comprising:
performing a beam management procedure to discover or maintain a beam pair link by simultaneously transmitting a first reference signal in a first set of beams and a second reference signal in a second set of beams,
wherein the beam management procedure comprises:
sequentially sweeping through beams of the first set of beams while transmitting the first reference signal in the first set of beams; and
sequentially sweeping through beams of the second set of beams while transmitting the second reference signal in the second set of beams,
wherein the first set of beams is transmitted at the first antenna array of the radio transceiver device and in a first polarization, and
wherein the second set of beams is transmitted at the second antenna array of the radio transceiver device and in a second polarization.

16. The radio transceiver of claim 15, wherein performing the beam management procedure to discover or maintain the beam pair link comprises:
simultaneously transmitting the first reference signal in the first set of beams and the second reference signal in the second set of beams;
determining a first measurement based on the first reference signal and a second measurement based on the second reference signal; and determining the beam pair link based on the first measurement and the second measurement.

17. The radio transceiver device of claim 15, wherein a first burst of occurrences of the first reference signal is transmitted per beam in the first set of beams, and
wherein a second burst of occurrences of the second reference signal is transmitted per beam in the second set of beams.

18. The radio transceiver device of claim 15, wherein each of the first reference signal and the second reference signal are transmitted at a respective antenna port of the radio transceiver device.

19. The radio transceiver device of claim 15, wherein the first polarization and the second polarization are mutually orthogonal.

20. A non-transitory computer-readable medium having instructions stored therein that are executable by processing circuitry of a radio transceiver device to cause the radio transceiver device to perform operations, the operations comprising:
performing a beam management procedure to discover or maintain a beam pair link by simultaneously transmitting a first reference signal in a first set of beams and a second reference signal in a second set of beams,
wherein the beam management procedure comprises:
sequentially sweeping through beams of the first set of beams while transmitting the first reference signal in the first set of beams; and
sequentially sweeping through beams of the second set of beams while transmitting the second reference signal in the second set of beams,
wherein the first set of beams is transmitted at a first antenna array of the radio transceiver device and in a first polarization, and
wherein the second set of beams is transmitted at a second antenna array of the radio transceiver device and in a second polarization.

21. The non-transitory computer-readable medium of claim 20, wherein performing the beam management procedure to discover or maintain the beam pair link comprises:
simultaneously transmitting the first reference signal in the first set of beams and the second reference signal in the second set of beams;
determining a first measurement based on the first reference signal and a second measurement based on the second reference signal; and
determining the beam pair link based on the first measurement and the second measurement.

* * * * *